United States Patent
Kobayashi et al.

(10) Patent No.: US 9,029,459 B2
(45) Date of Patent: May 12, 2015

(54) CURABLE COMPOSITION

(75) Inventors: Keita Kobayashi, Shibukawa (JP); Kimihiko Yoda, Shibukawa (JP); Jun Watanabe, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 691 days.

(21) Appl. No.: 12/997,260

(22) PCT Filed: Jun. 11, 2008

(86) PCT No.: PCT/JP2008/060711
§ 371 (c)(1),
(2), (4) Date: Dec. 10, 2010

(87) PCT Pub. No.: WO2009/150727
PCT Pub. Date: Dec. 17, 2009

(65) Prior Publication Data
US 2011/0086973 A1    Apr. 14, 2011

(51) Int. Cl.
| C08L 31/00 | (2006.01) |
| C09J 133/08 | (2006.01) |
| C08F 220/18 | (2006.01) |
| C08F 222/10 | (2006.01) |
| C08K 5/14 | (2006.01) |
| C08K 9/10 | (2006.01) |

(52) U.S. Cl.
CPC ............ *C09J 133/08* (2013.01); *C08F 220/18* (2013.01); *C08F 222/1006* (2013.01); *C08K 5/14* (2013.01); *C08K 9/10* (2013.01); *Y10S 525/936* (2013.01)

(58) Field of Classification Search
USPC ................ 524/558, 500; 526/227; 525/936
See application file for complete search history.

(56) References Cited

U.S. PATENT DOCUMENTS

| 3,538,011 | A | * | 11/1970 | van der Klaauw | ........ 252/186.26 |
| 5,959,002 | A | * | 9/1999 | Kuramochi et al. | ........... 523/176 |
| 6,025,074 | A | * | 2/2000 | Matsuo | ........................ 428/402.2 |
| 6,420,467 | B1 | * | 7/2002 | Ohtsuka et al. | ................ 524/314 |
| 2010/0204389 | A1 | * | 8/2010 | Taguchi et al. | ................ 524/533 |

FOREIGN PATENT DOCUMENTS

| CN | 1226589 A | 8/1999 |
| JP | 53 5894 | 3/1978 |
| JP | 1 146975 | 6/1989 |
| JP | 2 306955 | 12/1990 |
| JP | 8 302288 | 11/1996 |
| JP | 3 412 469 | 3/2003 |
| JP | 2008 7585 | 1/2008 |
| WO | 97 20864 | 6/1997 |
| WO | WO 2006082903 A1 * | 8/2006 |

OTHER PUBLICATIONS

Translation of JP2008007585, 2008.*
Machine translation of CN1226589, 1999.*
International Search Report issued Sep. 16, 2008 in PCT/JP08/060711 filed Jun. 11, 2008.

* cited by examiner

*Primary Examiner* — Wenwen Cai
(74) *Attorney, Agent, or Firm* — Oblon, McClelland, Maier & Neustadt, L.L.P.

(57) ABSTRACT

Provided is a curable composition which contains: an organic peroxide encapsulated in microcapsules which further contains a plasticizer; an accelerator which reacts with the organic peroxide to accelerate polymerization; (meth)acrylate compounds which may contain a (meth)acrylate having a carboxylic group and a (meth)acrylate having an alicyclic hydrocarbon; and a multifunctional (meth)acrylate different from the (meth)acrylate having a carboxylic group. The curable composition exhibits a quick curing rate.

9 Claims, No Drawings

CURABLE COMPOSITION

CROSS-REFERENCE TO RELATED APPLICATIONS

The present application is a 35 U.S.C. §371 National Stage patent application of International patent application PCT/JP2008/060711, filed on Jun. 11, 2008.

TECHNICAL FIELD

The present invention relates to an acrylic curable composition, particularly an acrylic room temperature-curable composition for an adhesive.

BACKGROUND ART

Heretofore, as a room temperature-curable acrylic adhesive composition, two-part type acrylic adhesives have been known. As an typical example, a second-generation acrylic adhesive (SGA) has been known.

SGA can be divided into two types depending on the state of the two parts to be used. One is called one main part-one sub part type (primer type) such that a curing initiator is added to a main part comprising an acrylic monomer as the main component to form one main part, and a liquid prepared by dissolving or dispersing an accelerator in a solvent or the like is used as a primer (one sub part). The other is two main parts type wherein an acrylic monomer and a curing initiator are added to one of two main parts, and an acrylic monomer and an accelerator are added to the other main part.

Among them, although the two-main parts SGA is a two-parts type, it is not necessary to accurately weigh the two-main parts SGA since it has a high reactive conductivity, and thereby its handling efficiency is excellent. Further, oil surface bonding is thereby possible, and the two-main parts type SGA is excellent in balance of the shear adhesive strength, the peeling adhesive strength and the impact adhesive strength. Further, since stuck out portions are also satisfactorily cured, the two-main parts SGA is widely used.

However, in the case of the two liquids type, a step for mixing two liquids is required. In a case where the two liquids type is used in automated lines, a mixer is used, however, if continuous coating is stopped, the two liquids type is cured, and it is necessary to replace the mixer. Further, as compared to one liquid type, a tank for adhesive, a tube for air-pressurizing the tank for adhesive and a tube for transporting an adhesive composition are required twice due to two liquids type, and its system is thereby complicated. Thus, one liquid type adhesive composition has been demanded whereby a mixer is not required, and facility is simplified.

As one liquid type adhesive compositions, heat curing types are available. However, a heating line is required for their production, and as compared to two liquids mixture type acrylic adhesives, electric power for heating, space for heating apparatus, and longer aging time after adhesion are required.

Although photocuring types are also available as one liquid type adhesive compositions, in a case of objects to be bonded through which light is not transmitted, even if a part at which an adhesive appears to outside is irradiated with light, a deep portion cannot be cured, and their applications are thereby restricted.

On the other hand, in the case of a curing composition containing capsules, a curing initiator or an accelerator is encapsulated in capsules, and these capsules are added to a base comprising, as a main component, a (meth)acrylic monomer containing an accelerator or a curing initiator which reacts with an encapsulated solution in the capsules. By applying a curable composition containing such capsules on objects to be bonded and compressing the curable composition between the objects to be bonded, the capsules are broken, and an encapsulated matter is released, whereby the curing initiator and the accelerator react in the base, and the objects are bonded.

The curable composition containing such capsules does not require heat required for heat curable types, light sources required for photocurable types and electric power for the light sources. Further, as restrictions of objects to be bonded, in the case of heat curable types, objects to be bonded are required to be made of a material having durability to heat for curing by heat, and in the case of photocurable types, objects to be bonded are required to be made of a material through which light is transmitted for curing by light. However, the curable composition containing capsules is free from such restrictions.

Further, in the case of the curable composition containing capsules, even a curing initiator or an accelerator which cannot be added to conventional two liquids type acrylic adhesives due to the deterioration of the storage stability can be maintained in a stable state by encapsulating it with a coating film of capsules. Thus, a large amount of a curing initiator or an accelerator can be incorporated. That is, it is possible to design a curable composition of which the curing rate can be controlled in a wide range, and which can be cured in a shorter time than conventional SGA and has excellent storage stability.

Further, in the case of two liquids type acrylic adhesives, curing proceeds when mixed and coated, and the desired properties cannot be obtained unless bonding is carried out within a restricted time. However, in the case of the curable composition containing capsules, curing will not proceed until the capsules are broken, and therefore, the curable composition containing capsules may be left for a long time even after applied to objects to be bonded.

By using a quickly curable composition containing capsules in production lines, time for producing bonded assemblies can be shortened, and curing steps can be simplified, whereby costs can be cut down remarkably.

Further, in a case where a curable composition is likely to be exposed to a high temperature for a long period e.g. by exportation to abroad or the like, a conventional two liquids acrylic curable composition is likely to undergo a reaction whereby the viscosity tends to increase, the physical properties tend to deteriorate, and problems in quality tend to arise. Whereas, the curable composition containing capsules is durable against transportation for a long period.

Under the above circumstances, specific capsule type-one liquid acrylic adhesives are proposed in the following Patent Documents 1 and 2. However, such capsule type-one liquid acrylic adhesives have a low curing rate, and cost reduction and improvement of production efficiency have not been accomplished. Further, in a case where large objects are bonded each other, since microcapsules are smaller than gaps between the objects, there is a problem such that curing cannot proceed sufficiently. In addition, in a case where such capsule type-one liquid acrylic adhesives are used for products which are required to have high durability in view of e.g. resistance, heat resistance, impact resistance, low stress property and high toughness, their physical properties are insufficient.

Patent Document 1: JP-A-1-146975
Patent Document 2: Japanese Patent No. 3,412,469

DISCLOSURE OF THE INVENTION

Object to be Accomplished by the Invention

As applications of the curable composition, products required to have high durability, etc are mentioned. For such products, moisture resistance, heat resistance, impact resistance, low stress property and high toughness are required. Further, a higher curing rate than conventional acrylic curable compositions is required for improving the production efficiency of production lines. Further, since high storage stability is required e.g. for exporting curable compositions to abroad, and in the case of two liquids types, objects to be bonded must be assembled in a short time i.e. in a few minutes from coating to adhesion, high handling efficiency is demanded for assembling objects by extension of time from coating to adhesion.

In order to respond to the above industrial demands, it is an object of the present invention to provide a curable composition which has adhesive properties at the same level as conventional adhesives for construction from the viewpoint of properties such as moisture resistance, heat resistance, impact resistance, low stress property and high toughness, with which objects to be bonded can be sufficiently bonded even if gaps are formed between the objects, if the size of the gaps are at a level of at most 100 μm, and which can be more quickly cured than conventional acrylic curable compositions.

Means to Accomplish the Object

The present inventors have conducted extensive studies and as a result, found that by adopting a construction comprising (a) an organic peroxide, (b) an accelerator which reacts with the organic peroxide to accelerate polymerization of monomers, (c) a monofunctional (meth)acrylate and (d) a multifunctional (meth)acrylate, wherein (a) the organic peroxide is encapsulated in microcapsules, the above problems can be solved. Thus, the present invention has been accomplished.

That is, the present invention provides a curable composition which comprises (a) an organic peroxide encapsulated in microcapsules, (b) an accelerator which reacts with the organic peroxide to accelerate polymerization of monomers, (c) a monofunctional (meth)acrylate and (d) a multifunctional (meth)acrylate (hereinafter may sometimes be referred to as a microcapsules-containing curable composition), preferably the above curable composition wherein (c) the monofunctional (meth)acrylate contains (c-1) a (meth)acrylate having a carboxylic group and (c-2) a (meth)acrylate having an alicyclic hydrocarbon, further preferably the above curable composition which contains (e) an elastomer, and the above curable composition which contains (f) a core-shell graft copolymer and/or (g) an inorganic filler.

Further, the present invention provides the above curable composition wherein the microcapsules have a particle size of at least 180 μm, preferably the above curable composition of which the bonding time is from 5 seconds to 5 minutes, further preferably the above curable composition which has a viscosity of from 500 mPa·s to 60,000 mPa·s as measured at 25° C. by a Brookfield viscometer (Rotor No. 6).

Further, the present invention provides a bonded assembly, wherein an object to be bonded is bonded by using the above curable composition, preferably the above bonded assembly wherein the object to be bonded is a sheet metal, the above assembly wherein the object to be bonded is an electrical component, further preferably the above bonded assembly wherein the electrical component is a motor.

Further, the present invention provides a pressure sensitive adhesive which is made of the above curable composition.

Effects of the Invention

The curable composition of the present invention is a microcapsule-one liquid type, whereby it is possible to omit a step of mixing liquids, which is required for two liquid types, controlling of a blend ratio or operations, conditions, etc. of which working efficiency is poor such that it is necessary to assemble objects to be bonded after applying and before curing a curable composition.

Further, in the case of the microcapsule-one liquid type curable composition of the present invention, it is not necessary to control the time from applying a curable composition to adhesion, it is possible to bond objects each other by simply compressing or rubbing, and the curing time is similar to or longer than conventional SGA whereby the production can be done with enough time, and objects can be bonded without using special jigs, tools or apparatus in most cases.

Further, in a case where the microcapsules-one liquid type curable composition of the present invention is used in automated lines, by adjusting its composition, handling efficiency and the curing rate can be improved, whereby the cost is reduced, and a cured product to be obtained has high heat resistance, moisture resistance, and impact resistance adhesive strength, a low residual stress against objects to be bonded, a high toughness and excellent heat shock resistance.

BEST MODE FOR CARRYING OUT THE INVENTION (a) The organic peroxide to be used in the present invention may, for example, be cumene hydroperoxide, paramenthane hydroperoxide, tertiary butyl hydroperoxide, diisopropylbenzene dihydroperoxide, methyl ethyl ketone peroxide, benzoyl peroxide or tertiary butyl peroxybenzoate, and one or more of them may be used. Among them, cumene hydroperoxide or benzoyl peroxide is preferred from the viewpoint of reactivity.

The amount of microcapsules encapsulating (a) the organic peroxide encapsulated to be used is preferably from 0.1 to 40 parts by mass, more preferably from 0.2 to 30 parts by mass, per 100 parts by mass of the total amount of the microcapsules encapsulating (a) the organic peroxide, (c) a monofunctional (meth)acrylate, (d) a multifunctional (meth)acrylate, (e) an elastomer and (f) a core-shell graft polymer in the curable composition.

By encapsulating (a) the organic peroxide in microcapsules, the organic peroxide can be prevented from contacting to materials which react with the organic peroxide, and a large amount of the organic peroxide can be contained in the curable composition. When microcapsules are broken, a large amount of the organic peroxide instantly contacts to the material which reacts with the organic peroxide, and as a result, the curing time can be decreased. The curable composition of the present invention is not cured until microcapsules are broken, whereby the storage stability can be remarkably improved.

In the case of prior arts in which conventional curable compositions are used, the curable compositions may deteriorate due to the influence of storage for a long period of time during a long period of transportation, exposure to high temperature or the like, and thereby their physical properties may deteriorate.

In the curable composition of the present invention, when a plasticizer is used as a diluent for the organic peroxide encapsulated in microcapsules, the deactivation of the microcapsules can be prevented more efficiently.

The plasticizer may, for example, be a phthalate such as di-2-ethylhexyl phthalate, dibutyl phthalate, diisooctyl phthalate, dibutyl phthalate, diisononyl phthalate, dicapryl phthalate or diisodecyl phthalate; an adipate such as di-2-ethylhexyl adipate, diisononyl adipate, diisobutyl adipate or diisodecyl adipate; a sebacate such as di-2-ethylhexyl sebacate; an azelate such as dioctyl acrylate; a phosphate such as tricresyl phosphate (TCP) or tri-2-ethylhexyl phosphate; a citrate such as tri-2-ethylhexyl citrate or acetylbutyl citrate; an acetylated glyceride such as glycerol diacetate monolaurate; or an epoxy glyceride such as epoxidized soybean oil or an epoxidized linseed oil.

Further, a compound which has at least one polymerizable double bond at the terminal or side chain of the molecule of the above-mentioned plasticizer can be used as a plasticizer for the curable composition.

Further, when a plasticizer of which the specific gravity is close to the base (main component) of the curable composition except for microcapsules is used as a diluent to be used in the present invention, the microcapsules can be prevented from precipitating, floating or separating.

As a material which forms a membrane of the microcapsules contained in the curable composition of the present invention (hereinafter referred to as membrane part of microcapsules), gelatin, an aldehyde resin, an acrylic resin, an epoxy resin or a urea resin may, for example, be mentioned. The aldehyde resin may, for example, be a urea-formaldehyde resin or a melamine-formaldehyde resin. Further, the urea resin may, for example, be a polyurea or a polyurethane resin.

Further, the microcapsules used in the present invention can be prepared by an interfacial polymerization method, an in-situ method, an insolubilization precipitation method, a coacervation method or a tumbling granulation method. Particularly, the microcapsules of the present invention are preferably prepared by the coacervation method.

In the curable composition of the present invention, when the contained microcapsules are compressed by an external force or the like and broken, an internal liquid containing the organic peroxide is released and reacts with the base (main component) of the curable composition other than the components encapsulated in the microcapsules, and curing proceeds. That is, the curable composition of the present invention is a pressure sensitive type curable composition which is cured by a compression force such as an external force, and a pressure sensitive adhesive can be prepared by using the curable composition of the present invention.

In the present invention, the ratio of the organic peroxide:plasticizer:membrane part of the microcapsules is preferably 5 to 96 mass %:2 to 90 mass %:2 to 50 mass %, more preferably 10 to 40 mass %:50 to 80 mass %:10 to 20 mass %, based on 100 mass % of the entire microcapsules containing internal liquid (the total of the organic peroxide, the plasticizer and the membrane part of the microcapsules).

Further, in the present invention, for example, in a case where gaps are formed between a bonding surface of two objects to be bonded such that sheet metals such as steel sheets having a large surface are bonded, the particle size of the microcapsules is increased, and the material, the thickness and the amount of a coating film are adjusted in order to improve the break ratio of the microcapsules by compression.

When the particle size of the microcapsules is $Y$ (μm), and the gap between objects to be bonded where the microcapsules are broken is $X$ (μm), the particle size of the microcapsules such that the microcapsules can be certainly broken in the gap can be designed by measuring the relationship of $X$ and $Y$ and calculating the particle size. As a result of a study, the present inventors have found that in a case where there is 100 μm of a gap between objects to be bonded, it is preferred to design a particle size distribution so that the lower limit of the particle size of the microcapsules is 180 μm. In usual applications in which the gap is not likely to be formed, the particle size of the microcapsules is preferably from 0.01 mm to 10.0 mm, more preferably from 0.05 to 1.0 mm.

In the case of the microcapsule-one liquid type acrylic curable composition, it is compressed at 0.22 MPa for from 5 to 6 seconds, or rubbed at 5 mm stroke 5 times while compressing at 0.063 MPa, in an assembly after coating whereby the microcapsules are broken, and the encapsulated organic peroxide is released and reacted with an accelerator, and curing proceeds.

As (b) the accelerator used in the present invention, an accelerator which reacts with (a) the organic peroxide to generate radicals may be used, and known accelerators may be used. As typical accelerators, a tertiary amine, a thiourea derivative and a transition metal salt may, for example, be mentioned.

The tertiary amine may, for example, be triethylamine, tripropylamine, tributylamine, N,N-dimethylparatoluidine or N,N-dimethylaniline.

The thiourea derivative may, for example, be 2-merpcatobenzimidazole, methylthiourea, dibutylthiourea, tetramethylthiourea or ethylenethiourea.

The transition metal salt may, for example, be cobalt octylate, cobalt naphthenate, copper naphthenate or vanadyl acetylacetonate.

The amount of (b) the accelerator to be used is preferably from 0.05 to 15 parts by mass, more preferably from 0.3 to 5 parts by mass, per 100 parts by mass of the total amount of (a), (c), (d), (e) and (f) in the curable composition. When the amount of (b) the accelerator is at least 0.05 part by mass, a sufficiently high curing rate can be obtained. When the amount of (b) the accelerator is at most 15 parts by mass, remaining of unreacted accelerator can be prevented, and deterioration of adhesive strength can be prevented.

(c) The monofunctional(meth)acrylate used in the present invention may, for example, be methyl(meth)acrylate, ethyl (meth)acrylate, propyl(meth)acrylate, butyl(meth)acrylate, 2-ethylhexyl(meth)acrylate, isooctyl(meth)acrylate, isodecyl (meth)acrylate, lauryl(meth)acrylate, stearyl(meth)acrylate, phenyl(meth)acrylate, 2-hydroxyethyl(meth)acrylate, 2-hydroxypropyl(meth)acrylate, 3-hydroxypropyl(meth)acrylate, 4-hydroxybutyl(meth)acrylate, tetrahydrofurfuryl (meth)acrylate, 2-hydroxy-3-phenoxypropyl(meth)acrylate, glycidyl(meth)acrylate, caprolactone-modified tetrahydrofurfuryl(meth)acrylate, 3-chloro-2-hydroxypropyl(meth) acrylate, N,N-dimethylaminoethyl(meth)acrylate, N,N-diethylaminoethyl(meth)acrylate, t-butylaminoethyl(meth) acrylate, ethoxycarbonylmethyl(meth)acrylate, phenol ethylene oxide-modified acrylate, phenol (ethylene oxide 2 mol-modified) acrylate, phenol (ethylene oxide 4 mol-modified) acrylate, p-cumylphenol ethylene oxide-modified acrylate, nonylphenol ethylene oxide-modified acrylate, nonylphenol (ethylene oxide 4 mol-modified) acrylate, nonylphenol (ethylene oxide 8 mol-modified) acrylate, nonylphenol (propylene oxide 2.5 mol-modified) acrylate, 2-ethylhexylcarbitol acrylate, trifluoroethyl(meth)acrylate, β-(meth)acryloyloxyethyl hydrogen succinate, ω-carboxypolycaprolactone mono(meth)acrylate, n-(meth)acryloyloxyalkyl hexahydrophthalimide, the after-mentioned (c-1) (meth)acrylate having a carboxylic group or the after-mentioned (c-2) (meth)acrylate having an alicyclic hydrocarbon. One or more of them can be used.

In the present invention, when as (c) the monofunctional (meth)acrylate, both the after-mentioned (c-1) (meth)acrylate having a carboxylic group and the after-mentioned (c-2) (meth)acrylate having an alicyclic hydrocarbon are contained, the curing time of the curable composition of the present invention can be remarkably increased, and such an effect contributes to mass production in production lines of assemblies.

(c-1) the (meth)acrylate having a carboxylic group may, for example, be acrylic acid, methacrylic acid, maleic acid, fumaric acid, ω-carboxy-polycaprolactone mono(meth)acrylate, phthalic acid monohydroxyethyl(meth)acrylate, (meth)acrylic acid dimer, β-(meth)acryloyloxyethyl hydrogen succinate, 2-acryloyloxyethyl succinic acid or 2-methacryloyloxyethyl succinic acid.

The amount of (c-1) the (meth)acrylate having a carboxylic group to be used is preferably from 0.5 to 50 parts by mass, more preferably from 1 to 25 parts by mass, per 100 parts by mass of the total amount of (a), (c), (d), (e) and (f) in the curable composition. In the present invention, since the (meth)acrylate having a carboxylic group is incorporated, it is possible to adjust the bonding time of the curable composition to be a short time, for example from 5 seconds to 5 minutes.

Depending on conditions where the assembly is used, the curable composition is required to have moisture resistance, heat resistance and low stress property.

In the present invention, a (meth)acrylate having a bulky alicyclic hydrocarbon is high is incorporated in the curable composition, whereby the moisture resistance, heat resistance and low stress property of the curable composition can be improved.

(c-2) The (meth)acrylate having an alicyclic hydrocarbon may, for example, be cyclohexyl(meth)acrylate, dicyclopentanyl(meth)acrylate, dicyclopentenyl(meth)acrylate, dicyclopentenyloxyethyl(meth)acrylate, isobornyl(meth)acrylate or methoxylated cyclodecatriene(meth)acrylate.

The amount of (c-2) the (meth)acrylate having an alicyclic hydrocarbon to be used is preferably from 5 to 80 parts by mass, more preferably from 10 to 60 parts by mass, per 100 parts by mass of the total amount of (a), (c), (d), (e) and (f) in the curable composition.

Further, in the present invention, by using (d) a multifunctional (meth)acrylate, the heat resistance and the impact adhesive strength are improved. Particularly, when a bifunctional (meth)acrylate having a molecular weight of at least 400 is used, the impact adhesive strength becomes high, and the low stress property and high toughness can be accomplished, such being desirable.

As (d) the multifunctional (meth)acrylate, a multifunctional (meth)acrylate oligomer or polymer wherein at least two of terminals and side chains of the oligomer or polymer are (meth)acryloylated; or a monomer having at least two (meth)acryloyl groups may be used. For example, the multifunctional (meth)acrylate oligomer or polymer may, for example, be 1,2-polybutadiene terminal urethane (meth)acrylate (for example, "TE-2000" or "TEA-1000" manufactured by Nippon Soda Co., Ltd.), a hydrogen adduct of the above-mentioned (meth)acrylate (for example, "TEAI-1000" manufactured by Nippon Soda Co., Ltd.), 1,4-polybutadiene terminal urethane (meth)acrylate (for example, "BAC-45" manufactured by Osaka Organic Chemical Industry Ltd.), polyisoprene terminal (meth)acrylate, polyester urethane (meth)acrylate, polyether urethane (meth)acrylate, polyester (meth)acrylate, or bis A-type epoxy (meth)acrylate (for example, "Biscoat #540" manufactured by Osaka Organic Chemical Industry Ltd. or "Biscoat VR-77" manufactured by Showa Highpolymer Co., Ltd.).

As a bifunctional (meth)acrylate monomer, 1,3-butylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dicyclopentanyl di(meth)acrylate, 2-ethyl-2-butyl-propanediol (meth)acrylate, neopentyl glycol-modified trimethylolpropane di(meth)acrylate, stearic acid-modified pentaerythritol diacrylate, a polyethleneglycol-modified bisphenol A di(meth)acrylate, a polypropyleneglycol-modified bisphenol A di(meth)acrylate, polypropylene glycol di(meth)acrylate, 2,2-bis(4-(meth)acryloxydiethoxyphenyl)propane, 2,2-bis(4-(meth)acryloxypropoxyphenyl)propane or 2,2-bis(4-(meth)acryloxytetraethoxyphenyl)propane may, for example, be mentioned.

As a trifunctional (meth)acrylate monomer, trimethylolpropane tri(meth)acrylate or tris[(meth)acryloxyethyl]isocyanurate may, for example, be mentioned.

As a tetrafunctional or higher functional (meth)acrylate monomer, dimethylolpropane tetra(meth)acrylate, pentaerythritol tetra(meth)acrylate, pentaerythritolethoxy tetra(meth)acrylate, dipentaerithritol penta(meth)acrylate or dipentaerithritol hexa(meth)acrylate may, for example, be mentioned.

The content of (d) the multifunctional (meth)acrylate is preferably from 0.5 to 70 parts by mass, more preferably from 2 to 50 parts by mass, per 100 parts by mass of the total amount of (a), (c), (d), (e) and (f) in the curable composition.

In the present invention, by adjusting the balance of the contents of (a), (b), (c) and (d), the curing rate of the curable composition becomes high, and the moisture resistance, the heat resistance, the impact adhesive strength, the low stress property, the high toughness, etc. can be improved with good balance.

Further, in a case where a part of the bonded assembly is a relatively soft material, since a stress is applied by shrinkage at the time of curing thermal expansion of the cured product or shrinkage by cooling, an object to be bonded may be broken, or adhesive strength may be impaired by the stress. Further, brittle fracture may occur due to expansion or shrinkage at a lower temperature side. In the present invention, (e) an elastomer is added, and the elastomer and the resin component are graft-polymerized, whereby the elastic modulus of the entire resin is lowered, and the elongation is increased, and the stress applied on the assembly bonded with the curable composition is thereby reduced, or high toughness is obtained.

(e) The elastomer may, for example, be a synthetic rubber or a natural rubber such as an acrylonitrile-butadiene-methacrylic acid copolymer, an acrylonitrile-butadiene-methyl methacrylate copolymer, an acrylonitrile-styrene-butadiene copolymer, an acrylonitrile-butadiene rubber, a flocculent polyurethane, a styrene-butadiene rubber, a chloroprene rubber or a butadiene rubber; a styrene thermoplastic elastomer such as a styrene-polybutadiene-styrene synthetic rubber; an olefin thermoplastic elastomer such as a polyethylene-EPDM synthetic rubber; a urethane thermoplastic elastomer such as a caprolactone type, an adipate type or a PTMG type; a polyester thermoplastic elastomer such as a polybutylene terephthalate-polytetramethylene glycol multiblock polymer; a polyamide thermoplastic elastomer such as a nylon-polyol block copolymer or a nylon-polyester block copolymer; 1,2-polybutadiene thermoplastic elastomer; or a vinyl chloride thermoplastic elastomer. So long as compatibility is excellent, one or more such elastomer components may be used.

The amount of (e) the elastomer to be used is preferably from 1 to 40 parts by mass, more preferably from 3 to 30 parts by mass, particularly preferably from 4 to 20 parts by mass, per 100 parts by mass of the total amount of (a), (c), (d), (e) and (f) in the curable composition.

In conventional techniques, in order to improve the storage stability of curable compositions, it is required to prevent microcapsules from separating by precipitation or floating, or in a case where curable compositions are used in production lines of bonded assemblies, it is required to reduce coating errors due to dripping or drooping from a nozzle for coating a curable composition.

In the present invention, in order to solve the above problems, (f) a core-shell graft polymer and/or (g) an inorganic filler is added to the curable composition, whereby a construction stickiness and a thixotropic property are imparted to the curable composition. Thus, it is possible to prevent microcapsules from separating due to precipitation or floating, while coating errors due to dripping or drooping from a nozzle in production lines can be prevented.

(f) The core-shell graft polymer of the present invention is an impact resistance modifier and viscosity modifier which is a core-shell type having a graft layer at an outside of rubber particles, and may, for example, be a butadiene-styrene-methyl methacrylate copolymer (MBS), a butadiene-styrene-acrylonitrile-methyl methacrylate copolymer (MBS), a silicone acryl composite rubber or an acrylic rubber. As commercially available MBS, "BTA712", manufactured by Kureha Corporation may be mentioned. As commercially available acrylic rubber, "W-450A", manufactured by Mitsubishi Rayon Co., Ltd. may be mentioned.

The blend amount of (f) the core-shell graft polymer is preferably from 3 to 40 parts by mass, more preferably from 5 to 25 parts by mass, per 100 parts by mass of the total amount of (a), (c), (d), (e) and (f) in the curable composition.

As (g) the inorganic filler, a silicon oxide powder such as "Aerosil #380", manufactured by Nippon Aerosil Co., Ltd., a mixture of magnesium oxide and silicon oxide such as "Calidria", manufactured by U.C.C. or aluminum hydroxide such as "HIGILITE", manufactured by Showa Denko K.K. may be used solely or as a mixture of them. Further, the blend amount of (g) the inorganic filler is preferably from 0.5 to 40 parts by mass, more preferably from 2 to 15 parts by mass, per 100 parts by mass of the total amount of (a), (c), (d), (e) and (f) in the curable composition.

By changing the amount of (e) the elastomer, (f) the core-shell graft polymer and/or (g) the inorganic filler to be added, the viscosity (as measured at 25° C. by a Brookfield viscometer (Rotor No. 6)) of the curable composition of the present invention can be controlled to from 500 mPa·s to 60,000 mPa·s. When the curable composition has a viscosity within the above range, separation of microcapsules by precipitation or floating can be prevented, and in a case where the curable composition is used in production lines of bonded assemblies, coating errors due to dripping or drooping from a nozzle for applying the curable composition can be prevented.

Further, in a case where the curable composition of the present invention is used for bonding objects containing a metal, a phosphate compound is preferably added in the curable composition in order to remarkably improve adhesive strength.

Further, the adhesion of the curable composition of the present invention to metal surfaces can be further improved by using in combination, a phosphate having a vinyl group or a (meth)acryl group, such as a (meth)acryloxyethyl acid phosphate, a dibutyl 2-(meth)acryloyloxyethyl acid phosphate, a dioctyl 2-(meth)acryloyloxyethyl phosphate, a diphenyl 2-(meth)acryloyloxyethyl phosphate, a (meth)acryloyloxyethyl polyethylene glycol acid phosphate or a (meth)acryloyloxyethyl acid phosphate monoethanolamine half salt.

The amount of the phosphate compound to be used is preferably from 0.1 to 5 parts by mass, more preferably from 0.5 to 3 parts by mass, per 100 parts by mass of the total amount of (a), (c), (d), (e) and (f) in the curable composition.

Various physical properties can be adjusted by adding a polymerizable vinyl monomer other than the polymerizable (meth)acrylic acid derivative in the curable composition of the present invention.

The polymerizable vinyl monomer other than the polymerizable (meth)acrylic acid derivative may, for example, be styrene, α-alkylstyrene, divinylbenzene, vinyl ether, divinyl ether, N-vinylpyrrolidone, 2-vinylpyridine or a vinyl ester such as vinyl acetate or vinyl propionate.

Further, physical properties of the curable composition of the present invention can be adjusted by using a polymerizable substance other than the polymerizable vinyl monomer. Such a polymerizable substance may, for example, be a polycarboxylic acid having a polymerizable unsaturated bond such as maleic acid, maleic anhydride, fumaric acid, itaconic acid, itaconic anhydride or citraconic acid; a monocarboxylic acid such as crotonic acid or isocrotonic acid; or a polymerizable olefin hydrocarbon having at least 6 carbon atoms. One or more of them may be used.

A compound comprising an organic compound and silicon can be incorporated in the curable composition of the present invention, whereby, the durability and the adhesion to objects to be bonded can be improved. The compound comprising an organic compound and silicon is an organic silicon compound having at least 2 functional groups differing in the reactivity in its molecule, as represented by the formula 1:

$$X_3Si\text{---}Y \qquad \text{(Formula 1)}$$

wherein X is a hydrolyzable group such as $CH_3O$—, $C_2H_5O$—, $CH_3OC_2H_4O$— or Cl—, and Y is an organic functional group such as a vinyl group, an epoxy group, an amino group, a mercapto group or a methacryl group.

The hydrolyzable group represented by X in the formula 1 is hydrolyzed with moisture in an aqueous solution or in air or moisture absorbed on the surface of an inorganic matter to generate a reactive silanol group (SiOH). This silanol group can be adsorbed on or chemically bond to an inorganic material such as glass, silica or a metal, whereby the initial adhesive strength of the curable composition of the present invention can be further improved. From the stability or handling efficiency, the hydrolyzable group represented by X is preferably a methoxy group or an ethoxy group. Further, Y in the formula 1 is not particularly restricted so long as it is an organic group which can be bonded to various synthetic organic resins, and as typical examples, a vinyl group, an epoxy group, a methacryl group, an amino group or a mercapto group may be mentioned.

Further, in order to improve the storage stability and the heat degradation resistance, a small amount of a polymerization inhibitor or an antioxidant may be used for the curable composition of the present invention. The polymerization inhibitor or the antioxidant may, for example, be methylhydroquinone, hydroquinone, 2,2-methylene-bis(4-methyl-6-tertiary-butylphenol), catechol, hydroquinone monomethyl ether, monotertiarybutyl hydroquinone, 2,5-ditertiary-butyl-hydroquinone, p-benzoquinone, 2,5-diphenyl-p-benzoquinone, 2,5-ditertiarybutyl-p-benzoquinone, picric acid, citric acid, lactic acid, tartaric acid, malic acid, glycolic acid, methyl lactate, ethyl lactate, ethyl glycolate, hydroxyacetone, dihydroxyacetone, acetoin, benzoin, phenothiazine, tertiary butylcatechol, 2-butyl-4-hydroxyanisole, p-methoxyphenol, 1,3,5-trimethyl-2,4,6-tris(3,5-di-tert-butyl-4-hydroxybenzyl)benzene or 2,6-ditertiary butyl-p-cresol.

The amount of the polymerization inhibitor or the antioxidant to be used is preferably from 0.001 to 3 parts by mass, more preferably from 0.01 to 2 parts by mass, per 100 parts by mass of the total amount of (a), (c), (d), (e) and (f) in the curable composition. When it is at least 0.001 part by mass, the storage stability is secured, and when it is at most 3 parts by mass, an excellent adhesive strength can be obtained, and uncuring can be prevented.

Further, in order to accelerate curing at parts which are exposed to air, various paraffins may be used for the curable composition of the present invention. The paraffin may, for example, be paraffin, a microcrystalline wax, carnauba wax, a beeswax, a lanolin, a spermaceti wax, a cerecin or a candelilla wax. Among them, paraffin is preferred.

The melting point of the paraffin is preferably from 40 to 100° C.

The amount of the paraffin to be used is preferably from 0.1 to 5 parts by mass, more preferably from 0.2 to 1 part by mass, per 100 parts by mass of the total amount of (a), (c), (d), (e) and (f).

Further, in a case where objects to be bonded with the curable composition of the present invention are metals, an anticorrosive agent may be added in order to prevent corrosion. For example, a volatile anticorrosive agent such as benzotriazole, tolyltriazole, dicyclohexylammonium nitride, dicyclohexylammonium salicylate, monoethanolamine benzoate, dicyclohexylammonium benzoate, diisopropylammonium benzoate, diisopropylammonium nitrite, cyclohexylamine carbamate, nitronaphthaleneammonium nitrite, cyclohexylamine benzoate, dicyclohexylammonium cyclohexanecarboxylate, cyclohexylamine cyclohexane carboxylate, dicyclohexylammonium acrylate or cyclohexylamine acrylate may be mentioned.

The amount of the anticorrosive agent to be used is preferably from 0.1 to 10 parts by mass, more preferably from 0.2 to 4 parts by mass, per 100 parts by mass of the total amount of (a), (c), (d), (e) and (f) in the curable composition.

Further, in addition, as the case requires, a known agent such as a plasticizer, a filler, an anticorrosive pigment or a coloring agent may be used for the curable composition of the present invention.

In the present invention, a bonded assembly can be produced by bonding objects to be bonded with a cured product of the curable composition. Materials of objects to be bonded are not particularly restricted, and paper, wood, ceramic, glass, pottery, rubber, plastic, mortar, concrete, metal, etc. may be mentioned. However, when objects to be bonded are made of a metal, the better adhesive effect can be exhibited.

The curable composition of the present invention can be used for an electrical component, and the electrical component may, for example, be a motor, a transformer or a speaker.

The curable composition of the present invention can also be used for computer cases or constructions using a sheet metal.

The curable composition containing microcapsules of the present invention requires no heat required for heat curable types, no light source nor electric power for the light source required for photocuring types. Further, as restrictions of objects to be bonded, in the case of heat curable types, objects to be bonded must be made of a material which has durability to heat since they are cured by heat, and in the case of photocurable types, objects to be bonded must be made of a material through which light transmits since they are cured by light. However, the curable composition of the present invention is free from such restrictions.

In the case of the curable composition containing microcapsules of the present invention, even a curing initiator or a large amount of an accelerator which cannot be added to conventional two liquids type acrylic adhesives due to the deterioration of the storage stability can be maintained in a stable state, by encapsulating it with a coating film of microcapsules. Thus, a large amount of the initiator or the accelerator can be incorporated. Therefore, it is possible to design a curable composition of which the curing rate can be controlled in a wide range, and which can be cured in a shorter time than conventional SGA and has excellent storage stability.

Further, in a case where a curable composition is likely to be exposed to a high temperature for a long period e.g. by exportation to abroad or the like, a conventional two liquids acrylic curable composition is likely to undergo a reaction, whereby the viscosity tends to increase, the physical properties tend to deteriorate, and problems in quality tend to arise. Whereas, the curable composition containing microcapsules is durable against transportation for a long period.

Further, in the case of two liquids type acrylic adhesive, curing proceeds when mixed and coated and the desired properties cannot be obtained unless bonding is carried out within a restricted time. However, in the case of the curable composition containing microcapsules of the present invention, curing will not proceed until the microcapsules are broken, and therefore, the curable composition containing the microcapsules may be left for a long time even after applied on objects to be bonded.

Since the curing time of the curable composition containing microcapsules of the present invention is short, if it is used in production lines, time for producing bonded to assemblies can be reduced, and a curing step can be simplified, whereby costs can be remarkably reduced.

EXAMPLES

Now, the present invention will be described in further detail with reference to Examples. However, it should be understood that the present invention is by no means restricted to such specific Examples. Further, the units of the amounts of respective materials to be used are represented by part(s) by mass.

Examples 1 to 21 and Comparative Examples 1 to 4

When the total amount of blended components is 126.2 parts by mass, the curable composition in Example 1 contains 10 parts by mass of microcapsules (gelatin coating film: 15 mass %, percumyl H80 (manufactured by NOF Corporation, cumene hydroperoxide: 80%): 30 mass %, tricresyl phosphate (manufactured by DAIHACHI Chemical Industry, Co., Ltd.): 55 mass %, the particle size: at least 180 μm, average particle size: 300 μm), 0.5 part by mass of vanadyl acetylacetonate (manufactured by Shinko Chemical Co., Ltd.), 15 parts by mass of methacrylic acid (manufactured by Mitsubishi Gas Chemical Co., Inc.), 45 parts by mass of dicyclopentenyloxyethyl methacrylate (QM-657, manufactured by Rohm and Haas Co.), 25 parts by mass of polyethylene oxide (10 mol) modified bisphenol A dimethacrylate (BPE500, manufactured by Shin-Nakamura Chemical Co., Ltd.), 5 parts by mass of NBR (N260S, manufactured by JSR Corporation), 15 parts by mass of MBS (BTA712, manufactured by Kureha Corporation), 0.5 part by mass of aerosil (R-974, manufactured by Nippon Aerosil Co., Ltd.), 3 parts by mass of polyethylene oxide (2 mol) modified bisphenol A dimethacrylate (BPE100, manufactured by Shin-Nakamura Chemical Co., Ltd.), 3 parts by mass of trimethylolpropane trimethacrylate (acrylic ester TMP, manufactured by Mitsubishi Rayon Co., Ltd.), 1.5 parts by mass of (2 hydroxyethyl) methacrylate acid phosphate (JPA514, manufactured by Johhoku Chemical Co., Ltd.), 0.5 part by mass of paraffin wax (melting point: 47° C., manufactured by NIPPON SEIRO CO., LTD.), 0.2 part by mass of phenothiazine (manufactured by Seiko Chemical Co., Ltd.) and 2 parts by mass of benzotriazole (manufactured by Seiko Chemical Co., Ltd.).

Respective curable compositions were prepared in a flask container made of SUS at 25° C. under the atmosphere by stirring.

Curable compositions were prepared by mixing starting materials shown in Tables 1 to 4 in compositions shown in Tables 1 to 4. With respect to the obtained curable compositions, the tensile shearing adhesive strength, the bonding time and the impact adhesive strength were measured, and the stress confirmation test, the storage stability test: stability of the base (main component) other than microcapsules of the curable composition, the storage stability test: stability against separation of microcapsules due to precipitation and floating, the moisture resistance test and the heat resistance test were carried out. Further, respective physical properties were measured as described below. The results are shown in Tables 1 to 4. Further, microcapsules used in Examples and Comparative Examples are shown in Table 5.

Further, in Tables 1 to 4, strength retention (%) is a value against the tensile shearing adhesive strength. Further, in "Comparative Example 4" in Table 4, objects were bonded by mixing a first liquid and a second liquid.

TABLE 1

| | | | Ex. 1 | Ex. 2 | Ex. 3 | Ex. 4 |
|---|---|---|---|---|---|---|
| Component | (a) At least one organic peroxide | Microcapsule 1 (see Table 5) | 10 | | | |
| | | Microcapsule 2 (see Table 5) | | 10 | | |
| | | Microcapsule 3 (see Table 5) | | | 10 | |
| | | Microcapsule 4 (see Table 5) | | | | 10 |
| | (b) Accelerator which forms redox system with the organic peroxide | Vanadyl acetylacetonate | 0.5 | 0.5 | 0.5 | 0.5 |
| | | Ethylenethiourea | | | | |
| | | Cobalt octylate | | | | |
| | (c-1) (Meth)acrylate having a carboxylic group | Methacrylic acid | 15 | 15 | 15 | 15 |
| | | Acrylic acid | | | | |
| | | 2-Methacyloyloxyethyl succinic acid | | | | |
| | (c-2) (Meth)acrylate having an alicyclic hydrocarbon | Dicyclopentenyloxyethyl methacrylate | 45 | 45 | 45 | 45 |
| | | Isobornyl methacrylate | | | | |
| | | Dicyclopentanyl acrylate | | | | |
| | (d) Multifunctional (meth)acrylate | Polyethylene oxide modified bisphenol A dimethacrylate (ethylene oxide 10 mol) | 25 | 25 | 25 | 25 |
| | | Polyethylene oxide modified bisphenol A dimethacrylate (ethylene oxide 2 mol) | 3 | 3 | 3 | 3 |
| | | Trimethylolpropane trimethacrylate | 3 | 3 | 3 | 3 |
| | (e) Elastomer | NBR, N260S | 5 | 5 | 5 | 5 |
| | | NBR, N250SL | | | | |
| | (f) Core-shell graft polymer | BTA712 | 15 | 15 | 15 | 15 |
| | | W-450A (manufactured by Mitsubishi Rayon Co., Ltd.) | | | | |
| | (g) Inorganic filler | Aerosil | 0.5 | 0.5 | 0.5 | 0.5 |
| | | Higilite | | | | |
| | Methyl methacrylate | | | | | |
| | (2 Hydroxyethyl)methacryl acid phosphate | | 1.5 | 1.5 | 1.5 | 1.5 |
| | Paraffin wax | | 0.5 | 0.5 | 0.5 | 0.5 |
| | Phenothiazine | | 0.2 | 0.2 | 0.2 | 0.2 |
| | Benzotriazole | | 2 | 2 | 2 | 2 |
| Physical property | Bonding time (second) | | 30 | 30 | 30 | 30 |
| | Storage stability improvement test for the base other than capsules at 40° C. for 8 weeks | | ○ | ○ | ○ | ○ |
| | Storage stability improvement test against precipitation and floating of capsules at 40° C. for 8 weeks | | X | ○ | ○ | ○ |
| | Tensile shearing adhesive strength | Adhesive strength (MPa) | 20 | 17.8 | 21 | 21.5 |
| | Moisture resistance at 80° C. at 95% for 1,000 hours | Strength retention (%) | 100 | 110 | 95 | 98 |
| | Heat resistance at 150° C. for 1,000 hours | Strength retention (%) | 89 | 104 | 111 | 109 |
| | Impact test | Impact adhesive strength (kJ/m$^2$) | 17 | 15.2 | 16.3 | 16.3 |
| | Adhesive property at an interval of 100 mm | Curing state | No problem | No problem | No problem | No problem |
| | Stress confirmation test | Warpage (mm) | 27 | 27 | 27 | 27 |
| | | State (after heat shock) | No crack | No crack | No crack | No crack |
| | Viscosity (Brookfield viscometer, 25° C. No. 6 rotor) | 20 rpm | 15000 | 16000 | 15000 | 17000 |
| | | 2 rpm | 32000 | 34000 | 30000 | 30000 |
| | | Construction viscosity (2 rpm/20 rpm) | 2.1 | 2.1 | 2.0 | 1.8 |

TABLE 2

|  |  |  | Ex. 5 | Ex. 6 | Ex. 7 |
|---|---|---|---|---|---|
| Component | (a) At least one organic peroxide | Microcapsule 1 (see Table 5) |  |  |  |
|  |  | Microcapsule 2 (see Table 5) |  |  |  |
|  |  | Microcapsule 3 (see Table 5) | 10 | 10 | 10 |
|  |  | Microcapsule 4 (see Table 5) |  |  |  |
|  | (b) Accelerator which forms redox system with the organic peroxide | Vanadyl acetylacetonate |  |  | 0.5 |
|  |  | Ethylenethiourea | 1 |  |  |
|  |  | Cobalt octylate |  | 6 |  |
|  | (c-1) (Meth)acrylate having a carboxylic group | Methacrylic acid | 15 | 15 | 10 |
|  |  | Acrylic acid |  |  | 5 |
|  |  | 2-Methacyloyloxyethyl succinic acid |  |  |  |
|  | (c-2) (Meth)acrylate having an alicyclic hydrocarbon | Dicyclopentenyloxyethyl methacrylate | 45 | 45 | 45 |
|  |  | Isobornyl methacrylate |  |  |  |
|  |  | Dicyclopentanyl acrylate |  |  |  |
|  | (d) Multifunctional (meth)acrylate | Polyethylene oxide modified bisphenol A dimethacrylate (ethylene oxide 10 mol) | 25 | 25 | 25 |
|  |  | Polyethylene oxide modified bisphenol A dimethacrylate (ethylene oxide 2 mol) | 3 | 3 | 3 |
|  |  | Trimethylolpropane trimethacrylate | 3 | 3 | 3 |
|  | (e) Elastomer | NBR, N260S | 5 | 5 | 5 |
|  |  | NBR, N250SL |  |  |  |
|  | (f) Core-shell graft polymer | BTA712 | 15 | 15 | 15 |
|  |  | W-450A (manufactured by Mitsubishi Rayon Co., Ltd.) |  |  |  |
|  | (g) Inorganic filler | Aerosil | 0.5 | 0.5 | 0.5 |
|  |  | Higilite |  |  |  |
|  | Methyl methacrylate |  |  |  |  |
|  | (2 Hydroxyethyl)methacryl acid phosphate |  | 1.5 | 1.5 | 1.5 |
|  | Paraffin wax |  | 0.5 | 0.5 | 0.5 |
|  | Phenothiazine |  | 0.2 | 0.2 | 0.2 |
|  | Benzotriazole |  | 2 | 2 | 2 |
| Physical property | Bonding time (second) |  | 320 | 400 | 20 |
|  | Storage stability improvement test for the base other than capsules at 40° C. for 8 weeks |  | ◯ | ◯ | ◯ |
|  | Storage stability improvement test against precipitation and floating of capsules at 40° C. for 8 weeks |  | ◯ | ◯ | ◯ |
|  | Tensile shearing adhesive strength | Adhesive strength (MPa) | 22 | 20.9 | 19.4 |
|  | Moisture resistance at 80° C. at 95% for 1,000 hours | Strength retention (%) | 88 | 101 | 87 |
|  | Heat resistance at 150° C. for 1,000 hours | Strength retention (%) | 102 | 99 | 93 |
|  | Impact test | Impact adhesive strength (kJ/m$^2$) | 16.1 | 15.5 | 16.2 |
|  | Adhesive property at an interval of 100 mm | Curing state | No problem | No problem | No problem |
|  | Stress confirmation test | Warpage (mm) | 24 | 24 | 40 |
|  |  | State (after heat shock) | No crack | No crack | No crack |
|  | Viscosity (Brookfield viscometer, 25° C. No. 6 rotor) | 20 rpm | 17000 | 16000 | 17000 |
|  |  | 2 rpm | 32000 | 33000 | 32000 |
|  |  | Construction viscosity (2 rpm/20 rpm) | 1.9 | 2.1 | 1.9 |

|  |  |  | Ex. 8 | Ex. 9 | Ex. 10 |
|---|---|---|---|---|---|
| Component | (a) At least one organic peroxide | Microcapsule 1 (see Table 5) |  |  |  |
|  |  | Microcapsule 2 (see Table 5) |  |  |  |
|  |  | Microcapsule 3 (see Table 5) | 10 | 10 | 10 |
|  |  | Microcapsule 4 (see Table 5) |  |  |  |
|  | (b) Accelerator which forms redox system with the organic peroxide | Vanadyl acetylacetonate | 0.5 | 0.5 | 0.5 |
|  |  | Ethylenethiourea |  |  |  |
|  |  | Cobalt octylate |  |  |  |
|  | (c-1) (Meth)acrylate having a carboxylic group | Methacrylic acid | 7.5 |  |  |
|  |  | Acrylic acid | 7.5 | 15 |  |
|  |  | 2-Methacyloyloxyethyl succinic acid |  |  | 15 |
|  | (c-2) (Meth)acrylate having an alicyclic hydrocarbon | Dicyclopentenyloxyethyl methacrylate | 45 | 45 | 45 |
|  |  | Isobornyl methacrylate |  |  |  |
|  |  | Dicyclopentanyl acrylate |  |  |  |
|  | (d) Multifunctional (meth)acrylate | Polyethylene oxide modified bisphenol A dimethacrylate (ethylene oxide 10 mol) | 25 | 25 | 25 |
|  |  | Polyethylene oxide modified bisphenol A dimethacrylate (ethylene oxide 2 mol) | 3 | 3 | 3 |
|  |  | Trimethylolpropane trimethacrylate | 3 | 3 | 3 |
|  | (e) Elastomer | NBR, N260S | 5 | 5 | 5 |
|  |  | NBR, N250SL |  |  |  |
|  | (f) Core-shell graft | BTA712 | 15 | 15 | 15 |

TABLE 2-continued

|  |  |  |  |  |  |
|---|---|---|---|---|---|
|  | polymer | W-450A (manufactured by Mitsubishi Rayon Co., Ltd.) |  |  |  |
|  | (g) Inorganic filler | Aerosil | 0.5 | 0.5 | 0.5 |
|  |  | Higilite |  |  |  |
|  | Methyl methacrylate |  |  |  |  |
|  | (2 Hydroxyethyl)methacryl acid phosphate |  | 1.5 | 1.5 | 1.5 |
|  | Paraffin wax |  | 0.5 | 0.5 | 0.5 |
|  | Phenothiazine |  | 0.2 | 0.2 | 0.2 |
|  | Benzotriazole |  | 2 | 2 | 2 |
| Physical property | Bonding time (second) |  | 15 | 5 | 30 |
|  | Storage stability improvement test for the base other than capsules at 40° C. for 8 weeks |  | ○ | ○ | ○ |
|  | Storage stability improvement test against precipitation and floating of capsules at 40° C. for 8 weeks |  | ○ | ○ | ○ |
|  | Tensile shearing adhesive strength | Adhesive strength (MPa) | 23.1 | 22 | 19.9 |
|  | Moisture resistance at 80° C. at 95% for 1,000 hours | Strength retention (%) | 89 | 100 | 120 |
|  | Heat resistance at 150° C. for 1,000 hours | Strength retention (%) | 102 | 106 | 95 |
|  | Impact test | Impact adhesive strength (kJ/m$^2$) | 15 | 14.5 | 15.2 |
|  | Adhesive property at an interval of 100 mm | Curing state | No problem | No problem | No problem |
|  | Stress confirmation test | Warpage (mm) | 42 | 49 | 36 |
|  |  | State (after heat shock) | No crack | No crack | No crack |
|  | Viscosity (Brookfield viscometer, 25° C. No. 6 rotor) | 20 rpm | 16000 | 17000 | 15000 |
|  |  | 2 rpm | 31000 | 30000 | 30000 |
|  |  | Construction viscosity (2 rpm/20 rpm) | 1.9 | 1.8 | 2.0 |

TABLE 3

|  |  |  | Ex. 11 | Ex. 12 | Ex. 13 | Ex. 14 | Ex. 15 | Ex. 16 |
|---|---|---|---|---|---|---|---|---|
| Component | (a) At least one organic peroxide | Microcapsule 1 (see Table 5) |  |  |  |  |  |  |
|  |  | Microcapsule 2 (see Table 5) |  |  |  |  |  |  |
|  |  | Microcapsule 3 (see Table 5) | 10 | 10 | 10 | 10 | 10 | 10 |
|  |  | Microcapsule 4 (see Table 5) |  |  |  |  |  |  |
|  |  | Microcapsule 5 (see Table 5) |  |  |  |  |  |  |
|  | (b) Accelerator which forms redox system with the organic peroxide | Vanadyl acetylacetonate | 0.5 | 0.5 | 0.5 | 0.5 | 0.5 | 0.5 |
|  |  | Ethylenethiourea |  |  |  |  |  |  |
|  |  | Cobalt octylate |  |  |  |  |  |  |
|  | (c-1) (Meth)acrylate having a carboxylic group | Methacrylic acid | 15 | 15 | 15 | 15 | 15 | 15 |
|  |  | Acrylic acid |  |  |  |  |  |  |
|  |  | 2-Methacyloyloxyethyl succinic acid |  |  |  |  |  |  |
|  | (c-2) (Meth)acrylate having an alicyclic hydrocarbon | Dicyclopentenyloxyethyl methacrylate |  |  |  | 45 |  | 45 |
|  |  | Isobornyl methacrylate | 45 |  |  |  |  |  |
|  |  | Dicyclopentanyl acrylate |  | 45 | 45 |  | 45 |  |
|  | (d) Multifunctional (meth)acrylate | Polyethylene oxide modified bisphenol A dimethacrylate (ethylene oxide 10 mol) | 25 | 25 | 25 | 25 | 25 | 25 |
|  |  | Polyethylene oxide modified bisphenol A dimethacrylate (ethylene oxide 2 mol) | 3 | 3 | 3 | 3 | 3 | 3 |
|  |  | Trimethylolpropane trimethacrylate | 3 | 3 | 3 | 3 | 3 | 3 |
|  | (e) Elastomer | NBR, N260S | 5 | 5 |  | 5 | 5 | 5 |
|  |  | NBR, N250SL |  |  |  |  |  |  |
|  | (f) Core-shell graft polymer | BTA712 | 15 | 15 | 15 | 17 |  |  |
|  |  | W-450A (manufactured by Mitsubishi Rayon Co., Ltd.) |  |  |  |  |  |  |
|  | (g) Inorganic filler | Aerosil | 0.5 | 0.5 | 0.5 |  | 6 |  |
|  |  | Higilite |  |  |  | 5 |  |  |
|  | Methyl methacrylate |  |  |  |  |  |  |  |
|  | (2 Hydroxyethyl)methacryl acid phosphate |  | 1.5 | 1.5 | 1.5 | 1.5 | 1.5 | 1.5 |
|  | Paraffin wax |  | 0.5 | 0.5 | 0.5 | 0.5 | 0.5 | 0.5 |
|  | Phenothiazine |  | 0.2 | 0.2 | 0.2 | 0.2 | 0.2 | 0.2 |
|  | Benzotriazole |  | 2 | 2 | 2 | 2 | 2 | 2 |
| Physical property | Bonding time (second) |  | 30 | 30 | 30 | 30 | 30 | 30 |
|  | Storage stability improvement test for the base other than capsules at 40° C. for 8 weeks |  | ○ | ○ | ○ | ○ | ○ | ○ |
|  | Storage stability improvement test against precipitation and floating of capsules at 40° C. for 8 weeks |  | ○ | ○ | ○ | ○ | ○ | ○ |
|  | Tensile shearing adhesive strength | Adhesive strength (MPa) | 20.1 | 22.2 | 19.9 | 18.1 | 19.6 | 20 |

TABLE 3-continued

|  |  |  |  |  |  |  |  |
|---|---|---|---|---|---|---|---|
| | Moisture resistance at 80° C. at 95% for 1,000 hours | Strength retention (%) | 105 | 96 | 95 | 96 | 96 | 101 |
| | Heat resistance at 150° C. for 1,000 hours | Strength retention (%) | 120 | 105 | 108 | 97 | 103 | 102 |
| | Impact test | Impact adhesive strength (kJ/m$^2$) | 14.7 | 16.9 | 9.9 | 16.9 | 16.9 | 17 |
| | Adhesive property at an interval of 100 mm | Curing state | No problem | No problem | No problem | No problem | No problem | No problem |
| | Stress confirmation test | Warpage (mm) | 30 | 43 | 70 | 43 | 50 | 54 |
| | | State (after heat shock) | No crack | No crack | cracked | No crack | No crack | No crack |
| | Viscosity (Brookfield viscometer, 25° C. No. 6 rotor) | 20 rpm | 17000 | 18000 | 2000 | 22000 | 18000 | 4000 |
| | | 2 rpm | 29000 | 30000 | 3500 | 35000 | 34000 | 5000 |
| | | Construction viscosity (2 rpm/20 rpm) | 1.7 | 1.7 | 1.8 | 1.6 | 1.9 | 1.3 |

|  |  |  | Ex. 17 | Ex. 18 | Ex. 19 | Ex. 20 | Ex. 21 |
|---|---|---|---|---|---|---|---|
| Component | (a) At least one organic peroxide | Microcapsule 1 (see Table 5) | 10 | | | | |
| | | Microcapsule 2 (see Table 5) | | | | | |
| | | Microcapsule 3 (see Table 5) | | | 10 | 10 | 10 |
| | | Microcapsule 4 (see Table 5) | | | | | |
| | | Microcapsule 5 (see Table 5) | | 10 | | | |
| | (b) Accelerator which forms redox system with the organic peroxide | Vanadyl acetylacetonate | 0.5 | 0.5 | 0.5 | 0.5 | 0.5 |
| | | Ethylenethiourea | | | | | |
| | | Cobalt octylate | | | | | |
| | (c-1) (Meth)acrylate having a carboxylic group | Methacrylic acid | 15 | 15 | 15 | 15 | 15 |
| | | Acrylic acid | | | | | |
| | | 2-Methacyloyloxyethyl succinic acid | | | | | |
| | (c-2) (Meth)acrylate having an alicyclic hydrocarbon | Dicyclopentenyloxyethyl methacrylate | 45 | 45 | | | |
| | | Isobornyl methacrylate | | | 45 | 45 | 45 |
| | | Dicyclopentanyl acrylate | | | | | |
| | (d) Multifunctional (meth)acrylate | Polyethylene oxide modified bisphenol A dimethacrylate (ethylene oxide 10 mol) | 25 | 25 | 25 | 25 | 25 |
| | | Polyethylene oxide modified bisphenol A dimethacrylate (ethylene oxide 2 mol) | 3 | 3 | 3 | 3 | 3 |
| | | Trimethylolpropane trimethacrylate | 3 | 3 | 3 | 3 | 3 |
| | (e) Elastomer | NBR, N260S | 5 | 5 | | 5 | 5 |
| | | NBR, N250SL | | | 5 | | |
| | (f) Core-shell graft polymer | BTA712 | | 15 | 15 | | 15 |
| | | W-450A (manufactured by Mitsubishi Rayon Co., Ltd.) | | | | 15 | |
| | (g) Inorganic filler | Aerosil | | 0.5 | 0.5 | 0.5 | |
| | | Higilite | | | | | 0.5 |
| | Methyl methacrylate | | | | | | |
| | (2 Hydroxyethyl)methacryl acid phosphate | | 1.5 | 1.5 | 1.5 | 1.5 | 1.5 |
| | Paraffin wax | | 0.5 | 0.5 | 0.5 | 0.5 | 0.5 |
| | Phenothiazine | | 0.2 | 0.2 | 0.2 | 0.2 | 0.2 |
| | Benzotriazole | | 2 | 2 | 2 | 2 | 2 |
| Physical property | Bonding time (second) | | 30 | 30 | 30 | 30 | 30 |
| | Storage stability improvement test for the base other than capsules at 40° C. for 8 weeks | | ◯ | ◯ | ◯ | ◯ | ◯ |
| | Storage stability improvement test against precipitation and floating of capsules at 40° C. for 8 weeks | | X | ◯ | ◯ | ◯ | ◯ |
| | Tensile shearing adhesive strength | Adhesive strength (MPa) | 21 | 18 | 22 | 19 | 21.1 |
| | Moisture resistance at 80° C. at 95% for 1,000 hours | Strength retention (%) | 92 | 80 | 98 | 101 | 105 |
| | Heat resistance at 150° C. for 1,000 hours | Strength retention (%) | 105 | 83 | 100 | 110 | 118 |
| | Impact test | Impact adhesive strength (kJ/m$^2$) | 16.6 | 16.5 | 14 | 15.2 | 15.5 |
| | Adhesive property at an interval of 100 mm | Curing state | No problem | Partially uncured | No problem | No problem | No problem |
| | Stress confirmation test | Warpage (mm) | 54 | 27 | 32 | 40 | 28 |
| | | State (after heat shock) | No crack | No crack | No crack | No crack | No crack |
| | Viscosity (Brookfield viscometer, 25° C. No. 6 rotor) | 20 rpm | 4000 | 16000 | 15000 | 16500 | 17100 |
| | | 2 rpm | 5000 | 37000 | 25000 | 28000 | 27500 |
| | | Construction viscosity (2 rpm/20 rpm) | 1.3 | 2.3 | 1.7 | 1.7 | 1.6 |

TABLE 4

|  |  |  | Comp. Ex. 1 | Comp. Ex. 2 | Comp. Ex. 3 | Comp. Ex. 4 First liquid | Comp. Ex. 4 Second liquid |
|---|---|---|---|---|---|---|---|
| Component | (a) At least one organic peroxide | Microcapsule 3 (see Table 5) | 10 | 10 | 10 |  |  |
|  |  | Microcapsule 5 (see Table 5) |  |  |  |  |  |
|  | (b) Accelerator which forms redox system with the organic peroxide | Vanadyl acetylacetonate | 0.5 | 0.5 | 0.5 |  | 1 |
|  |  | Ethylenethiourea |  |  |  |  |  |
|  |  | Cobalt octylate |  |  |  |  |  |
|  | (c-1) (Meth)acrylate having a carboxylic group | Methacrylic acid |  | 15 | 15 | 15 | 15 |
|  |  | Acrylic acid |  |  |  |  |  |
|  |  | 2-Methacyloyloxyethyl succinic acid |  |  |  |  |  |
|  | (c-2) (Meth)acrylate having an alicyclic hydrocarbon | Dicyclopentenyloxyethyl methacrylate | 45 |  | 45 | 45 | 45 |
|  |  | Isobornyl methacrylate |  |  |  |  |  |
|  |  | Dicyclopentanyl acrylate |  |  |  |  |  |
|  | (d) Multifunctional (meth)acrylate | Polyethylene oxide modified bisphenol A dimethacrylate (ethylene oxide 10 mol) | 25 | 25 |  | 25 | 25 |
|  |  | Polyethylene oxide modified bisphenol A dimethacrylate (ethylene oxide 2 mol) | 3 | 3 | 0 | 3 | 3 |
|  |  | Trimethylolpropane trimethacrylate | 3 | 3 | 0 | 3 | 3 |
|  | (e) Elastomer | NBR, N260S | 5 | 5 | 5 | 5 | 5 |
|  |  | NBR, N250SL |  |  |  |  |  |
|  | (f) Core-shell graft polymer | BTA712 | 15 | 15 | 15 | 15 | 15 |
|  |  | W-450A (manufactured by Mitsubishi Rayon Co., Ltd.) |  |  |  |  |  |
|  | (g) Inorganic filler | Aerosil | 0.5 | 0.5 | 0.5 | 0.5 | 0.5 |
|  |  | Higilite |  |  |  |  |  |
|  | Methyl methacrylate |  | 15 | 45 | 25 |  |  |
|  | (2 Hydroxyethyl)methacryl acid phosphate |  | 1.5 | 1.5 | 1.5 | 1.5 | 1.5 |
|  | Paraffin wax |  | 0.5 | 0.5 | 0.5 | 0.5 | 0.5 |
|  | Phenothiazine |  | 0.2 | 0.2 | 0.2 | 0.2 | 0.2 |
|  | Benzotriazole |  | 2 | 2 | 2 | 2 | 2 |
|  | Percumyl H80 (cumene hydroperoxide 80%) |  |  |  |  | 6 |  |
| Physical property | Bonding time (second) |  | 600 | 60 | 100 | 110 |  |
|  | Storage stability improvement test for the base other than capsules at 40° C. for 8 weeks |  | ○ | ○ | ○ | X | X |
|  | Storage stability improvement test against precipitation and floating of capsules at 40° C. for 8 weeks |  | ○ | ○ | ○ | — | — |
|  | Tensile shearing adhesive strength | Adhesive strength (MPa) | 18.1 | 23 | 21 | 20.5 |  |
|  | Moisture resistance at 80° C. at 95% for 1,000 hours | Strength retention (%) | 80 | 45 | 82 | 84 |  |
|  | Heat resistance at 150° C. for 1,000 hours | Strength retention (%) | 70 | 40 | 56 | 50 |  |
|  | Impact test | Impact adhesive strength (kJ/m$^2$) | 14.6 | 15.4 | 15 | 15.3 |  |
|  | Adhesive property at an interval of 100 mm | Curing state | No problem | No problem | No problem | No problem |  |
|  | Stress confirmation test | Warpage (mm) | 30 | 50 | 56 | 56 |  |
|  |  | State (after heat shock) | No crack | No crack | No crack | No crack |  |
|  | Viscosity (Brookfield viscometer, 25° C. No. 6 rotor) | 20 rpm | 17000 | 13000 | 16000 | 15500 | 14000 |
|  |  | 2 rpm | 30000 | 28000 | 31000 | 30500 | 30000 |
|  |  | Construction viscosity (2 rpm/20 rpm) | 1.8 | 2.2 | 1.9 | 2.0 | 2.1 |

TABLE 5

|  |  |  | Content | Average particle size (mm) | Lower limit of particle size (mm) |
|---|---|---|---|---|---|
| Microcapsules 1 | Encapsulated matter | PH-80 (cumene hydroperoxide 80%) | 30% | 0.30 | 0.18 |
|  |  | Tricresyl phosphate | 55% |  |  |
|  | Coating film | Gelatin | 15% |  |  |
| Microcapsules 2 | Encapsulated matter | PH-80 (cumene hydroperoxide 80%) | 30% | 0.30 | 0.18 |
|  |  | Diisodecyl adipate | 55% |  |  |
|  | Coating film | Gelatin | 15% |  |  |

TABLE 5-continued

|  |  |  | Content | Average particle size (mm) | Lower limit of particle size (mm) |
|---|---|---|---|---|---|
| Microcapsules 3 | Encapsulated matter | PH-80 (cumene hydroperoxide 80%) | 30% | 0.30 | 0.18 |
|  |  | Diisononyl adipate | 55% |  |  |
|  | Coating film | Gelatin | 15% |  |  |
| Microcapsules 4 | Encapsulated matter | PH-80 (cumene hydroperoxide 80%) | 30% | 0.30 | 0.18 |
|  |  | Diisodecyl phthalate | 55% |  |  |
|  | Coating film | Gelatin | 15% |  |  |
| Microcapsules 5 | Encapsulated matter | PH-80 (cumene hydroperoxide 80%) | 30% | 0.15 | 0.075 |
|  |  | Tricresyl phosphate | 55% |  |  |
|  | Coating film | Gelatin | 15% |  |  |

[Tensile Shearing Adhesive Strength]

The tensile shearing adhesive strength was measured by the method in accordance with JIS K-6850. That is, one surface of a test sample (100 mm×25 mm×1.6 mm, SPCC-D (cold-rolled steel plate) sandblast treated) was coated with a curable composition, and the coated test sample was overlaid on the other test sample (100 mm×25 mm×1.6 mm, SPCC-D, sandblast treated). The overlaid part was pressurized by a push pull gauge (model 1S, manufactured by KOMURA) under a load of 7 kgf for from 5 to 6 seconds to bond the test samples. Then, the bonded assembly was cured for 24 hours at room temperature, and this assembly was used as a specimen for measuring tensile shearing adhesive strength. The tensile shearing adhesive strength (unit: MPa) was measured at a temperature of 23° C. and under a humidity of 50% at a tensile rate of 10 mm/min.

[Bonding Time]

The bonding time was measured by the method in accordance with JIS K-6850 at 23° C. under a humidity of 50%. That is, one surface of one test sample (100 mm×25 mm×1.6 mm, SPCC-D, sandblast treated) was coated with a curable composition, and the coated test sample was overlaid to the other test sample (100 mm×25 mm×1.6 mm, SPCC-D, sandblast treated). The overlaid part was pressurized by a push pull gauge (model 1S, manufactured by KOMURA) under a load of 7 kgf for from 5 to 6 seconds to bond the test samples, and the bonded assembly was used as a specimen for measuring bonding time. As the bonding time of the specimen, the time until the specimen shows an adhesive strength of at least 0.125M as measured by a push pull gauge (model 1S, manufactured by KOMURA), immediately after pressurized at 23° C. under a humidity of 50%, was regarded as the bonding time (second).

[Impact Adhesive Strength]

The impact adhesive strength was measured by the method in accordance with JIS K-6855 at 23° C. under a humidity of 50%. That is, one surface of one test sample (44 mm×25 mm×19 mm, sandblast treated iron) was coated with a curable composition, and the coated test sample was overlaid to the other test sample (25 mm×25 mm×9 mm, sandblast treated iron), and bonded by rotating them 90° clockwise and counterclockwise and rubbing them, while applying a pressure of 0.063 MPa. Then, the bonded assembly was cured for 24 hours under the same condition to prepare a specimen for measurement. The impact adhesive strength (kJ/m$^2$) was measured at 23° C. under a humidity of 50% by an impact tester.

[Confirmation Test for Curing State at an Interval of 100 μm]

One surface of a test sample (100 mm×25 mm×1.6 mm, SPCC-D sandblast treated) was coated with a curable composition, and two pieces of steel wire of 100 μm were put thereon. Further, a PET film having a thickness of 100 μm was put on the test sample, and the sample was assembled with the other test sample (100 mm×25 mm×1.6 mm, SPCC-D). The assembled part was clipped, while the assembled part was pressurized at a load of 7 kgf for from 5 to 6 seconds by a push pull gauge (model 1S, manufactured by KOMURA). Then, the test samples were left at room temperature for 24 hours, the PET film was peeled off, and curing state of the adhesive was confirmed.

[Residual Stress Confirmation Test]

In the residual stress confirmation test, the curable composition of the present invention is formed in two liquids, and they are mixed to form a cured product having a size of 25 mm×95 mm×2 mm, which is adhered at the center of SPCC (200 mm×25 mm×0.3 mm). The residual stress is confirmed by the degree (mm) of warpage of the sample. Further, the heat shock test is carried out for 10 cycles of −45° C. for 1 hour to 120° C. for 1 hour, and the state is confirmed.

[Storage Stability Test: Stability of the Base (Main Component) Other than Microcapsules of Curable Composition]

100 cc of a curable composition is exposed at 70° C. for 7 hours in a polyethylene container. The curable composition is stirred again. Then, whether the bonding time and the shearing adhesive strength are different from those before the exposure or not is confirmed. Evaluation was carried out as follows.

◯: The degree of the change of physical properties was not problematic.

x: The degree of the change of physical properties was problematic.

[Storage Stability Test: Stability Against Separation of Microcapsules Due to Precipitation and Floating]

2.5 kg of a curable composition was exposed at 40° C. for 8 weeks in a polyethylene container having a height of about 20 cm. The curable composition at under 1 cm from a liquid surface of the curable composition and the curable composition at above 1 cm from the bottom were sampled by a dropper. The change of the shearing adhesive strength and the bonding time between before and after the exposure was confirmed.

Evaluations were carried out as follows.

◯: The degree of the change of physical properties was not problematic.

x: The degree of the change of physical properties was problematic.

-: Not evaluated.

[Moisture Resistance Test]

A cold-rolled steel plate (JIS G3141) 100 mm×25 mm×1.6 mm and a cold-rolled steel plate (JIS G3141) 100 mm×25 mm×1.6 mm are compressed and bonded with a bond area of 25 mm×12.5 mm under a compression load of 7 kg for from 5 to 6 seconds. The compression shear test is carried out with this specimen at 10 mm/min and evaluated. The exposure is carried out at 80° C. under a humidity of 95% for 1,000 hours. The compression shear strength (strength retention (%)) is measured before and after the exposure.

[Heat Resistance Test]

A cold-rolled steel plate (JIS G3141) 100 mm×25 mm×1.6 mm and a cold-rolled steel plate (JIS G 3141) 100 mm×25 mm×1.6 mm were compressed and bonded with a bond area of 25 mm×12.5 mm under a compression load of 7 kg for from 5 to 6 seconds. Then, the bonded steel plates were exposed at 150° C. for 1,000 hours, and before and after the exposure, the shear test at 10 mm/min was carried out to measure and evaluate the strength retention (%).

INDUSTRIAL APPLICABILITY

The curable composition, the adhesive, the cured product and the bonded assembly of the present invention are useful for, for example, assembling computer cases, constructions using a sheet metal, motors, transformers and speakers and are industrially very useful, due to adhesive properties at the same level as conventional adhesives for constructions from the viewpoint of properties such as moisture resistance, heat resistance, impact resistance, low stress property and high toughness, and a higher curing property than conventional acrylic curable compositions.

The invention claimed is:

1. A curable composition, comprising:
   (a) an organic peroxide encapsulated in a microcapsule;
   (b) an accelerator;
   (c) (meth)acrylate compounds, comprising (c-1) a (meth)acrylate having a carboxylic acid group, and (c-2) a (meth)acrylate having an alicyclic hydrocarbon;
   (d) a multifunctional (meth)acrylate different from the (c-1);
   (e) an elastomer; and
   (f) a core-shell graft copolymer;
   wherein
   the microcapsule further comprises a plasticizer,
   an average particle size of the microcapsule is from 180 to 300 µm,
   a content of the (c-1) (meth)acrylate having a carboxylic acid group is from 0.5 to 50 parts by mass per 100 parts by mass of a total amount of (a), (c), (d), (e) and (f), and
   a content of the (c-2) (meth)acrylate having an alicyclic hydrocarbon is from 5 to 80 parts by mass per 100 parts by mass of a total amount of (a), (c), (d), (e) and (f).

2. The curable composition according to claim 1, which has a viscosity of from 500 mPa·s to 60000 mPa·s as measured at 25° C. by a Brookfield viscometer with rotor No. 6.

3. The curable composition according to claim 1, wherein the microcapsules further comprise a microcapsule membrane, and wherein the weight ratio of the organic peroxide: the plasticizer:the microcapsule membrane is 5-96 wt. %:2-90 wt. %:2-50 wt. %, based on 100 wt. % of the microcapsules.

4. The curable composition according to claim 1, wherein the microcapsules further comprise a microcapsule membrane, and wherein the weight ratio of the organic peroxide: the plasticizer:the microcapsule membrane is 10-40 wt. %:50-80 wt. %:10-20 wt. %, based on 100 wt. % of the microcapsules.

5. A bonded assembly, comprising the curable composition as defined in claim 1 in a cured state.

6. The bonded assembly according to claim 5, wherein an object to be bonded is a sheet metal.

7. The bonded assembly according to claim 5, wherein an object to be bonded is an electrical component.

8. The bonded assembly according to claim 7, wherein the electrical component is a motor.

9. A pressure sensitive adhesive which comprises the curable composition as defined in claim 1.

* * * * *